May 5, 1964 W. F. M. GRAY 3,132,205
POROUS COATINGS FOR ELECTRIC CONDUCTORS
Filed Aug. 31, 1961

Inventor,
Willard F. M. Gray,
Francis X. Doyle
His Attorney.

United States Patent Office 3,132,205
Patented May 5, 1964

3,132,205
POROUS COATINGS FOR ELECTRIC CONDUCTORS
Willard F. M. Gray, Hancock, Mass., assignor to General Electric Company, a corporation of New York
Filed Aug. 31, 1961, Ser. No. 135,194
8 Claims. (Cl. 174—124)

This invention relates to electrical conductors for use in fluid electrical apparatus and more particularly to the use of porous coatings on such electrical conductors.

It is well known to those skilled in the electrical apparatus art that fluid dielectric material is used in many such electrical apparatuses as an insulating medium. Some well known fluids used as insulating mediums are various types of insulating gases, electrical grade mineral oil and various synthetic fluids such as diphenyl chloride. In various electrical apparatuses which utilize these dielectric fluids, the electrical conductors are generally provided with an insulating material which is coated on the wire to form a continuous insulating film about such wire. Various types of wire insulation are well known and include, among others, various types of enamels such as, for example, phenolic modified polyvinyl formal enamel. This insulating coating on the wire serves to insulate the adjacent turns of the wire from each other when such wire is wound into a coil. In general, the strength of the insulating film on the wire determines the amount of electrical voltage which can be carried by the wire. The thicker the insulating film about the wire, the greater will be the voltage which such wire can carry. However, with continuous enamel films, the voltage gradient of such insulation usually decreases with an increase in thickness of the enamel. That is, the thicker the enamel film, the less electrical stress the film can withstand for each mil of thickness, even though the over-all electrical strength of the insulation will be increased. Thus, were it desired to double the electrical strength of a continuous film insulation, it would be necessary to increase its thickness by a factor of three or more.

It is also well known that continuous film insulations are relatively expensive to apply to wire. This is, of course, due to the expensive type of machinery necessary for coating such film of the wire, as well as to the expense of the materials used in such coating. Further, in applying continuous film insulation, the wire tends to become work-hardened due to the repeated flexing of the wire during the coating of such wire. As is well understood in utilizing the various machines which are well known in the art to apply a continuous film on a wire, the wire is generally strung over a substantial number of pulleys and in carrying the wire through such machines, the wire is flexed repeatedly during the coating proces. As will be understood, this repeated flexing of the wire tends to work-harden the wire, thereby making it less flexible and less readily formed into the desired coils. From the above it can be seen that there is presently a need in the fluid-filled electrical apparatus field for a coating for electrical conductors which will provide a substantial uniform voltage gradient, which will be relatively inexpensive, and which will not result in work-hardening of the wire.

An unexpected discovery has been made that by applying a porous, uniform coating of a material to a bare electrical conductor and using such coated conductor in a fluid-filled electrical apparatus that the porous coating will provide an excellent insulating medium and will also provide a substantially uniform voltage gradient for such electrical conductor. If the thickness of the porous coating is doubled, the dielectric strength of the insulating value in the fluid-filled system is substantially doubled. The material may be coated about the wire in any desired manner, although one preferred method of obtaining the desired porous, uniform coating is to braid the material on the wire. As used throughout this specification and claims the term "braid" will be used to mean a process of serving any desired number of strands of material about a bare electrical conductor in one direction and weaving among the served strands at least one strand of material in the opposite direction to thereby tie down the served strand to the electrical conductor.

Other methods which may be used to place a uniform porous coating on a bare electrical conductor are serving, weaving, and knitting. Serving is merely the continuous wrapping of strands or filaments about a wire. Weaving is generally similar to braiding, while knitting is interlacing a filament or filaments by a series of connected loops. As used herein the term uniform means that the thickness of the coating on the wire is substantially the same throughout the length of the wire and the openings in the coating are substantially the same between any two adjacent strands or filaments along the length of the wire.

While the exact reason for obtaining a good insulation by use of a porous, uniform coating of material, and one which has a substantially uniform voltage gradient, is not completely understood, it is believed that the insulation value is due to the dielectric fluid in which the porous coated electrical conductors are used. It is believed that the insulation strength of the fluid is increased within porous coating due to the tortuous columns or channels of fluid which is formed in the porous material between adjacent conductors. Clearly, when the thickness of the porous coating is substantially doubled; the tortuous column or channel which is formed in the porous material is substantially doubled thereby providing a substantially uniform voltage gradient.

It is, therefore, one object of this invention to provide a coating for electrical conductors, for use in dielectric fluids which will have a substantially uniform voltage gradient.

Another object of this invention is to provide a coating for electrical conductors which may be applied to such conductors without work-hardening the conductors.

A further object of this invention is to provide a porous coating for electrical conductors for use in dielectric fluids where the insulation strength of such coating depends on the insulation strength of the dielectric fluid.

Still another object of this invention is to provide a porous coating for electrical conductors which can be applied to such conductors by an inexpensive process, such as braiding, weaving, knitting, or serving.

In carrying out this invention in one form, a number of strands or filaments of material are served about a bare electrical conductor in one direction while at least one strand of the same material is interwoven among the served strands in the opposite direction.

The invention which it is desired to protect by this application will be specifically pointed out and distinctly claimed in the claims appended hereto. However, it is believed that this invention and the manner in which its objects and advantages are obtained, as well as other objects and advantages thereof, will be better understood from the following detailed description, especially when considered in the light of the accompanying drawings in which:

Figure 1:
FIGURE 1 is a microphotograph of a cross-section of a parallel pair of rectangular wires with a porous, uniform coating applied thereto according to one form of this invention.

Referring now to the drawings, in which like numerals are used to indicate like parts throughout and with particular reference to FIG. 1, there is shown a microphotograph of a parallel pair of rectangular wires having a porous, uniform coating applied thereto according to one form of this invention. As shown in FIG. 1, each of the parallel, rectangular wires 10 has applied thereto a porous coating of material 12. The porous coating 12 is applied to each of the rectangular wires 10 by means of a braiding process. It will be understood that any other process of forming the porous, uniform coating could be used. As can be seen from FIG. 1, there is no direct path through the porous coatings 12 from one conductor 10 to the other conductor 10. Instead a substantial number of small openings are formed in each separate layer of the braided porous coating 12.

When the parallel rectangular wires 10 are immersed in a dielectric fluid, such as, for example, an electric grade mineral oil, the mineral oil readily flows through the porous openings in the coatings 12, substantially impregnating the entire porous coating with the mineral oil. Thus, any voltage path between one of the conductors 10 and the opposite conductor 10 will be a tortuous path through one of the various openings in each of the layers of material making up the porous coating 12. Each of these pores is completely filled with the mineral oil or other dielectric fluid in which the pair is immersed. Therefore, the insulating strength between one conductor 10 and the opposite conductor 10 is the narrow channel or column of dielectric fluid which delineates a tortuous path through the various openings in the coatings 12, from one conductor to the other. As will be well understood, this tortuous column of dielectric fluid will provide a substantially large insulating value as compared to that obtained were the bare wires merely separated by the dielectric fluid. Thus, from FIG. 1 it is seen that by means of the porous coating of this invention, a good insulating medium is provided for the conductors when immersed in a dielectric fluid which is much greater than either the dielectric fluid or the insulating strength of the porous coating itself.

Figure 2:
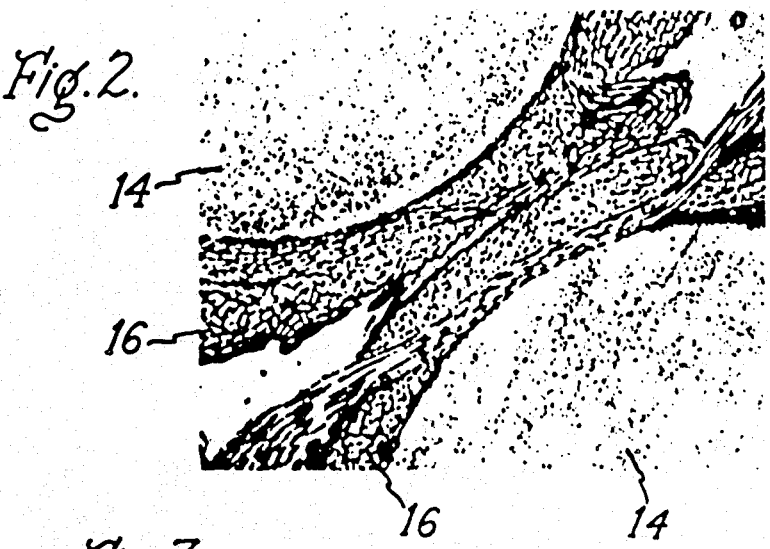
FIGURE 2 is a microphotograph of a cross-section of a twisted pair of round wires having a porous, uniform coating applied thereto according to one form of this invention.

Referring now to FIG. 2 of the drawing, there is shown a microphotograph of a twisted pair of round wires which are provided with a porous coating according to one form of this invention. In FIG. 2, the twisted pair of round wires are labeled 14 while the porous coating applied to each of the wires is indicated at 16. In a manner similar to that shown in FIG. 1, it can be readily seen that the large number of porous openings in the various layers of the porous material 16 describe an extremely tortuous path for one conductor 14 to the other conductor 14. As in the example of FIG. 1, where the twisted wire pair is immersed in an electric grade mineral oil, or other dielectric fluid, the porous coating 16 will be completely impregnated with such dielectric fluid. Again, in the manner mentioned with respect to FIG. 1, of the drawing, this impregnation with dielectric fluid will provide for long, tortuous, narrow columns of fluid between one conductor 14 and the opposite conductor 14. These narrow columns will provide a substantially good insulation between such conductors, such insulation being better than either that of the dielectric fluid, alone or of the porous material comprising the coating on the wires taken alone.

Test results made on samples of braided and woven textiles used as a separator between the bare electric conductors, tested in electric grade mineral oil, indicate that a flat 60-cycle dielectric strength of substantially 1,000 volts per mil is obtained. These tests were made with a thickness of a conductor separator ranging from 6 to 20 mils. In general, it was found that the type of the material, for example, silk, nylon, glass, etc. has substantially no effect upon the breakdown levels. That is, whether the porous coating is made of silk or whether it is made of glass or other material, the same dielectric strength of substantially 1,000 volts per mil has been obtained, when the thickness of the separation between conductors is between approximately 6 and 20 mils. Therefore, it is seen that with the porous uniform coating of this invention, despite the type of material used to make the porous coating, substantially the same voltage gradient is obtained between the coated conductors.

As an example of one of the tests which was made, 8 twisted pairs of approximately 23 mil round copper wire were made with each wire of each pair covered by black silk braided fishline. These pairs of wire were then immersed in electrical grade mineral oil and while immersed therein, given a 60-cycle breakdown test. The average value of the kilovolts breakdown voltage was approximately 18.4 kilovolts. Microscopic measurements were made between the wire strands to determine the thickness of the porous coating therebetween. These measurements indicated that the average spacing between the twisted pairs was approximately 18.3 mils. This, of course, gives a 60-cycle breakdown strength of approximately 1,000 volts per mil. A second test was performed on a pair of rectangular wires approximately 250 mils by 600 mils which were covered with white glass braided tubing. Each pair was subjected to a 60-cycle breakdown test while immersed in electrical grade mineral oil. The average breakdown voltage was 10.7 kilovolts. On measuring the separation between the two pair of wires, it was found that the average spacing was approximately 10.6 mils. Again, it can be seen that a volts per mil breakdown of approximately 1,000 volts is obtained. As a third example, a twisted pair of 45 mils copper wire was tested, the wires being covered by a black silk braid. The 60-cycle breakdown of this pair was approximately 13.5 kilovolts. The measurement of the spacing between the twisted pair provided a measurement of approximately 13.3 mils. Again, it can be seen that the average volts per mil obtained is 1,000 volts. As a fourth example, eight twisted pairs of 43-mil bare copper wire covered with black nylon braid were immersed in electric grade mineral oil and tested under 60-cycle breakdown. The average 60-cycle breakdown of these pairs was 13.5 kilovolts. The various pairs were measured as to the spacing between the wires and an average of 13.5 mils was obtained. This test also provided a dielectric strength of 1,000 volts per mil for 60-cycle breakdown. From the above examples, it is seen that regardless of the type of material utilized in the porous covering, as long as the conductors covered by such material are immersed in a dielectric fluid, a substantially constant voltage breakdown is obtained.

Figure 3:
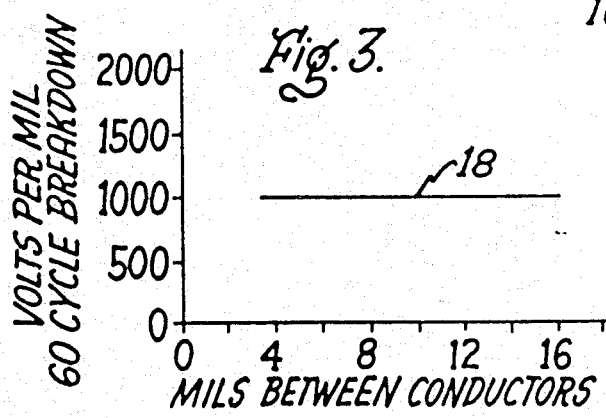
FIGURE 3 is the plot of a graph showing the substantially uniform voltage gradient which is obtained by use of the porous coating of this invention.

Referring to FIG. 3 of the drawing it can be seen that the curve 18 has been provided indicating the volts per mil 60-cycle breakdown according to the various separation between the wires tested. As can be seen from the curve 18 a substantial uniform voltage gradient is obtained of approximately 1,000 volts per mil for distances between wires of 4 to 18 mils.

Other tests were made utilizing an insulation of a polyamide filament made by the Du Pont Company. The tests were made utilizing this polyamide filament, inasmuch as the filament has extremely good thermal stability and would, therefore, be very desirable in electrical apparatus which might be subjected to high temperatures. The following examples show the use of the polyamide filament when applied to both rectangular and round wire and subjected to a 60-cycle breakdown voltage. In the first example, a pair of parallel rectangular wires were covered with the polyamide filament of approximately 200 denier at a rate of approximately of 4 feet per minute. The size of the wire was approximately 250 x 100 mils and the average 60-cycle breakdown voltage was 11.8 kilovolts. The measured thickness of the insulation separating the parallel wires was 11.94 mils. This provided a dielectric strength of approximately 990-volt per mil. The microphotograph shown in FIG. 1 of the drawing is a microphotograph of a parallel pair of rectangular wires which were used in the above example.

In a second example, the polyamide filament was applied to a twisted pair of 45-mils diameter copper wire which was then subjected to a 60-cycle breakdown voltage test while submerged in electrical grade mineral oil. In the test, the 60-cycle breakdown voltage was 9.8 kilovolts while the measured insulation thickness between the pairs was 10.02 mils. This gives an average dielectric strength of 980 volts per mil. The microphotograph shown in FIG. 2 of the drawing is a microphotograph of the twisted wire pair used in this example. Thus, from the above, it is clear that regardless of the type of filament used to obtain the porous coating on the electrical conductors, that a substantially constant dielectric strength is obtained.

Other tests were made with various types of porous coatings applied to electric conductors in various warp. In some instances the dielectric strength was found to be substantially less than 1000 volts per mil, while other were found to exceed 1000 volts per mil. The dielectric varied from 800 volts per mil to 1360 volts per mil. In micromeasurements made on the various openings in these porous coatings it was found that where all dimensions of such openings exceed 3 mils that the dielectric strength of such coatings falls below 1000 volts per mil. Where at least one dimension of the openings in the porous material is substantially 3 mils then the dielectric strength of the coated conductor is approximately 1000 volts per mil. However, where at least one dimension of the openings in the porous coating is less than 3 mils then the dielectric strength was found to be greater than 1000 volts per mil.

From the above it can be seen that by means of the porous coatings of this invention that an insulation is provided for electrical conductors which are used in electrical apparatus, having a dielectric fluid as its principal insulation therein, which coating will provide for an insulation on the electrical conductors having a substantially uniform voltage gradient. As has been shown above, the dielectric strength of the porous coating in a dielectric fluid, where at least one dimension of the openings in the coating is 3 mils will be substantially 1000 volts per mil.

While there has been shown and described the present preferred embodiments of this invention, it will be obvious that many changes and modifications may be made in such embodiments. It will also be apparent that such changes and modifications may be made without departing from the spirit and scope of the invention as defined in the appended claims.

What is claimed as new and what is desired to be secured by Letters Patent of the United States is:

1. An electrical conductor for use in a fluid filled electrical apparatus having a porous coating comprising a plurality of filaments of material wrapped about said conductor to provide a porous coating thereon of substantially uniform thickness throughout said length of the conductor, the pores of said porous coating having at least one dimension measuring 3 mils or less.

2. An electrical conductor for use in dielectric fluids, said conductor having a porous coating providing a substantially constant dielectric strength of 1,000 volts per mil, comprising a plurality of filaments wrapped about said conductor, said plurality of filaments forming a coating of substantially uniform thickness throughout the length of said conductor and openings between said filaments, said openings having at least one dimension of substantially 3 mils.

3. An electrical conductor for use in a dielectric fluid, having a porous coating providing an insulation strength in the dielectric fluid of at least 1000 volts per mil, comprising a plurality of filaments of material wrapped about said conductor, said filaments forming a coating of substantially uniform thickness throughout the length of said conductor, and openings between said filaments, said openings having at least one dimension measuring 3 mils or less.

4. An electrical conductor having a porous coating comprising a plurality of filaments of material wrapped about said conductor, said plurality of filaments forming a coating of substantially uniform thickness throughout the length of said conductor, and openings in said coating between said filaments, said openings being of substantially uniform dimension, at least one dimension measuring approximately 3 mils.

5. An electrical conductor having a porous coating as claimed in claim 4 in which said filaments are braided on said electrical conductor.

6. An electrical conductor having a porous coating as claimed in claim 4 in which said filaments are served on said electrical conductor.

7. An electrical conductor having a porous coating as claimed in claim 4 in which said filaments are woven on said electrical conductor.

8. An electrical conductor having a porous coating as claimed in claim 4 in which said filaments are knitted on said electrical conductor.

References Cited in the file of this patent

UNITED STATES PATENTS

| | | |
|---|---|---|
| 239,538 | Patterson | Mar. 29, 1881 |
| 424,575 | Reed | Apr. 1, 1890 |